(12) United States Patent
Okun et al.

(10) Patent No.: US 9,957,174 B2
(45) Date of Patent: May 1, 2018

(54) METHODS AND COMPOSITIONS FOR REMOVING PHOSPHATES FROM WATER

(71) Applicant: Natural Chemistry L.P., Norwalk, CT (US)

(72) Inventors: Richard Okun, Fayetteville, NY (US); Frank J. Cerio, II, Leland, NC (US)

(73) Assignee: N.C. Brands Inc., Norwalk, CT (US)

( * ) Notice: Subject to any disclaimer, the term of this patent is extended or adjusted under 35 U.S.C. 154(b) by 272 days.

(21) Appl. No.: 14/689,345

(22) Filed: Apr. 17, 2015

(65) Prior Publication Data

US 2015/0218021 A1    Aug. 6, 2015

Related U.S. Application Data

(63) Continuation-in-part of application No. 14/081,473, filed on Nov. 15, 2013, now abandoned, which is a continuation-in-part of application No. 13/744,486, filed on Jan. 18, 2013, now abandoned.

(60) Provisional application No. 61/588,743, filed on Jan. 20, 2012.

(51) Int. Cl.
| | |
|---|---|
| *B01D 21/01* | (2006.01) |
| *C02F 1/52* | (2006.01) |
| *C02F 101/10* | (2006.01) |
| *C02F 3/34* | (2006.01) |
| *C02F 103/42* | (2006.01) |

(52) U.S. Cl.
CPC .......... *C02F 1/5236* (2013.01); *C02F 1/5272* (2013.01); *C02F 1/5263* (2013.01); *C02F 3/342* (2013.01); *C02F 2101/105* (2013.01); *C02F 2103/42* (2013.01)

(58) Field of Classification Search
CPC .. C02F 2103/42; C02F 2101/105; C02F 1/52; C02F 1/5236; C02F 1/5272; C02F 2303/18; B01D 21/01; Y10S 210/906
USPC ......................... 210/632, 703, 723
See application file for complete search history.

(56) References Cited

U.S. PATENT DOCUMENTS

| | | | |
|---|---|---|---|
| 2002/0005382 A1* | 1/2002 | Kulperger | ................. C02F 1/42 210/632 |
| 2009/0223903 A1* | 9/2009 | Coffey | .................... C02F 1/505 210/754 |

\* cited by examiner

*Primary Examiner* — Claire A Norris
(74) *Attorney, Agent, or Firm* — John W. Ryan

(57) ABSTRACT

The present invention is directed to compounds and methods for use in removing phosphate from water. Preferably the compound is used in removing phosphate from water in swimming pools, spas, and similar structures. Several water treatment techniques are disclosed, as well as a variety of different methods for delivery of the active ingredients. These delivery methods include use of a slurry of the active reagent in solution as well as a tablet, powder, or granulated structure. Additionally, the water treatment techniques may incorporate the use of a combination including both enzymatic compositions and compounds for phosphate removal.

15 Claims, 2 Drawing Sheets

METHODS AND COMPOSITIONS FOR REMOVING PHOSPHATES FROM WATER

This application is a continuation-in-part of U.S. patent application Ser. No. 14/081,473, filed Nov. 15, 2013, which is a continuation-in-part of U.S. patent application Ser. No. 13/744,486 filed Jan. 18, 2013, which claims priority to U.S. Provisional Patent Application No. 61/588,743, filed Jan. 20, 2012, the disclosures of which are hereby incorporated in their entireties.

BRIEF DESCRIPTION OF THE INVENTION

This application relates generally to compounds and methods which remove phosphates from solution. More particularly, the application is directed to the use of zinc compounds, lanthanum compounds, and aluminum compounds to remove orthophosphates from water. The application is also directed to enzymatic treatment of a solution in conjunction with phosphate removal.

BACKGROUND OF THE INVENTION

Algal growth includes, but is not limited to, growth of any of a number of different lower photosynthetic plants such as green algae. Often these are unicellular aquatic plants. Growth of these plants becomes problematic in swimming pools and spas as it is unsightly and often generates a disagreeable odor. The presence of such plant life may provide a gateway for growth of other organisms, some of which could be harmful to a pool's users.

Eutrophication is the gradual increase of nutrients in a body of water. The scientific community has recognized that phosphorous plays a significant role in the process of eutrophication. Further, phosphorous compounds play a role in all phases of algal metabolism, as many of these compounds are involved in energy transforming reactions. For instance, during photosynthesis, light energy is used to convert inorganic phosphate into adenosine triphosphate (ATP). ATP then serves as an energy source driving other metabolic reactions. Phosphates and Phosphate Substitutes in Detergents (Part 2): Hearings Before a Subcommittee of the Committee on Government Operations, House of Representatives, 92nd Congress, Appendix 2, Role of Phosphorus in Eutrophication, Report of A. F. Bartsch, Director, National Environmental Research Center, Environmental Protection Agency, p. 663 (1971).

It is generally known that algal growth does not occur in swimming pools when appropriate levels of sanitizers are used and the pool water is kept near a zero or other very low phosphate level. Where algae growth is kept to a minimum, pool maintenance is greatly reduced. Sanitizers are widely known in the art, including chlorine, however, a satisfactory method for controlling phosphate levels has not been previously available.

As indicated, phosphate, more particularly, orthophosphate, is of critical importance for the growth of algae. In certain embodiments, the present invention provides an affordable, easy method for removing phosphates from water. Swimming pools are constantly exposed to a wide variety of contaminants, from rain and runoff, windblown dust and dirt particles, and even the pool occupants themselves. These contaminants provide a constant influx of phosphate into the pool. Thus, a need arises for a technique to remove these phosphate on a continuing basis.

While certain chemical methods to bind dissolved compounds for their removal from water are known, none incorporate all of the advantages and benefits presented in the embodiments of this invention. U.S. Pat. No. 5,897,784 ("the '784 patent") to Dudley Mills teaches, among other things, methods and compositions for treating swimming pool water by removing one or more nutrients necessary for algal growth. Another Dudley Mills U.S. Pat. No. 5,683,953, ("the '953 patent"), also teaches methods and compositions for treating swimming pool water by removing one or more nutrients necessary for algal growth.

The '784 and '953 methods and compositions do not incorporate all of the benefits and advantages of the present invention. Certain embodiments of the present invention relate to partially soluble phosphate scavengers. The solubility of the selected reactant is of particular importance as solubility is directly related to the rate of the reaction as a whole, or reaction rate. Reaction rate refers to the number of reactions, on a molecular level, that reach completion in a given time period. While a given reaction will proceed at the same rate on a molecular level, the reaction rate will differ with relation to, among other things, the solubility of the reactants. Thus, one disadvantage of the known methods and compositions is that because of their insolubility, the reactants are slow-acting. As a result, it may take days, or even weeks, for a reaction to have progressed to the degree that it becomes useful.

In other instances, only the molecules on the surface of the particle may react with the target ion or compound, and as such, the compound's reaction is limited by its available surface area. Once the entirety of surface molecules of a given particle have reacted, those unreacted molecules on the interior of the particle are unable to react, as these unreacted molecules are effectively sealed within the particle. The net result is that a much greater amount of reactant compound need be used in order to react with a given amount of phosphate, as only the available surface area of any particle is reactive. This causes greater cost and inconvenience to the user.

Among other things, the phosphate removal rate in swimming pools is dependent upon the turnover rate of the water, or the amount of water that passes over the filter in a given time. The total time it takes to achieve a desirable level of phosphate depends on both the phosphate removal rate and the initial level of phosphate present in the water. Using the previously available technology, removal of phosphates may occur so slowly that it is ineffective. The end result is increased difficultly and expensive in maintaining a pool or spa. The highly effective and rapid method for removing phosphates described herein provides a solution to these previously unsolved problems.

This is of tremendous importance, as certain embodiments of the present invention may be used to rapidly remove phosphates from water and then maintain the water at a zero or near-zero phosphate level. Such a condition is highly desirable for pool water chemistry. This is achieved without forming significant amounts of insoluble zinc phosphate throughout the pool water, as is observed when a high solubility reactant is used. More specifically, this is achieved by only using reactants of suitable solubility, resulting in a reaction that proceeds neither too quickly nor too slowly. In addition, the bulk of the reaction takes place on or within the filter, and the insoluble zinc phosphate is trapped therein. Certain embodiments of the present invention are equally effective for use in maintaining a pool's water clarity and purity over a longer period of time, as the amount of reactant in the water system at any given time may be replenished.

It is also known in the prior art to employ a lanthanum compound with a high solubility in water. An example of such a compound is $LaCl_3$. While the use of such a compound does have certain benefits, namely that the phosphate becomes bound as insoluble lanthanum phosphate relatively quickly, it also has certain disadvantages. The increased solubility of the reactant allows is to quickly diffuse throughout the aqueous body to which it is added. The amount of lanthanum that immediately reacts is limited only by the amount of available phosphate, and because the reaction takes place on a relatively large scale, a large amount of phosphate may react to form lanthanum phosphate over a short period of time.

A variety of compounds useful for enzymatic treatment of the water are described in U.S. Pat. No. 5,503,766. The compounds include a cleaner or water clarifier primarily comprising an enzyme composition and a saponin as active ingredients. When used alone, these compositions are effective at reducing pool maintenance, however when a treatment program using such compositions is employed together with phosphate scavenging, additional benefits are obtained, provided normal sanitation of the pool is maintained.

The present invention provides many advantages over the previously known methods and compositions for treating pool water.

The combination of enzymatic compounds with that of phosphate removal results in a realization of benefits much greater than those one might otherwise predict from the combination. One overall result is an unexpected increase in the effectiveness of the treatment program. The water in pools and spas treated in this manner is kept clear and odor-free. The necessity of chemically shocking the water with chlorine or other harsh chemicals becomes less frequent. Further, the water is not irritating to the skin, eyes, and mucous membranes of the pool or spa users. In frequently used facilities the above benefits have reduced the amount of cleaning and maintenance by 50% or more. The combination presents an approach to pool or spa maintenance that is highly effective and thus superior to any known treatments.

SUMMARY OF THE INVENTION

The present invention includes methods and compositions for removing phosphate from water. Maintenance of a level of orthophosphates, in particular, below 100 parts per billion is highly desirable for pool owners and maintainers. Additionally, certain embodiments relate to methods and compositions that include the combination of removing phosphates and enzymatically treating water. These embodiments work, in part, by reacting any phosphates in the water to form an insoluble reaction product that is easily removed from the water using traditional water cleaning devices. Such devices may include, by way of example, a mechanical apparatus such as a water filter. By eliminating or suppressing the phosphate level to near zero, the pool will require far less maintenance and upkeep, both in terms of working hours and money. A novel feature of certain embodiments is that the phosphate scavenging occurs on or within the filter so that the reaction product is easily removed. The novel combination of removing phosphates from water and adding an enzymatically active composition greatly reduces the labor and resources required to maintain the clarity and cleanliness of an aqueous body, when adequate sanitation is maintained.

One embodiment relates to a method for purifying a solution having as a first step reacting a zinc compound, a lanthanum compound, and an aluminum compound with an impure solution. As is described herein, other embodiments are not limited to partially soluble zinc compounds and may include combinations of compounds having different solubilities. A second step includes allowing the reagent to react with impurities in the solution to form a reaction product. Finally, the reaction product is removed from the solution.

Another embodiment of the present invention relates to a method for treating a water body comprising the steps of introducing a phosphate-scavenging composition comprising a zinc compound, a lanthanum compound, and an aluminum compound to the water body, introducing a second composition comprising an enzymatic compound to the water body, allowing the first composition to react with impurities in water body to form an insoluble reaction product, removing the reaction product from the solution; and, allowing the second composition to clarify the water body.

Further embodiments of the present invention relate to a zinc compound, a lanthanum compound, and an aluminum compound in combination with various enzymes. Compounds in accordance with the present invention may be in a form selected from the group consisting of a slurry, a tablet, a powder, or granulated.

DETAILED DESCRIPTION OF THE INVENTION

Figure 1:
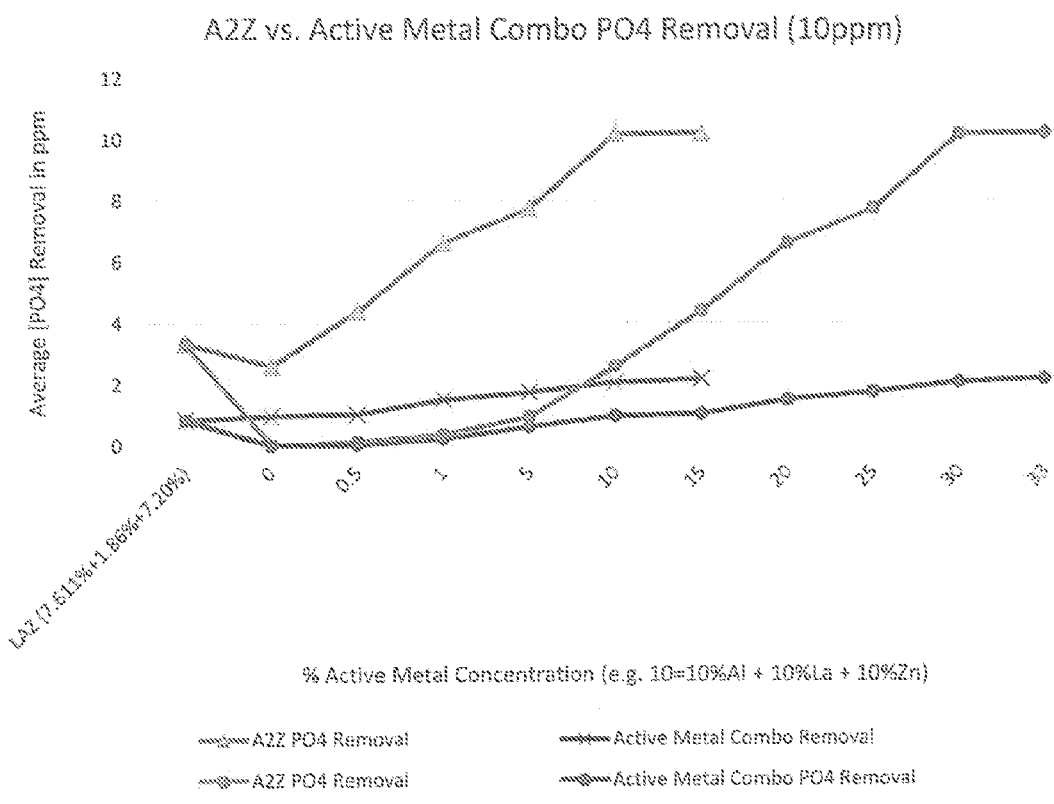
FIG. 1 is a chart showing the effectiveness of one embodiment of the present invention.
Figure 2:
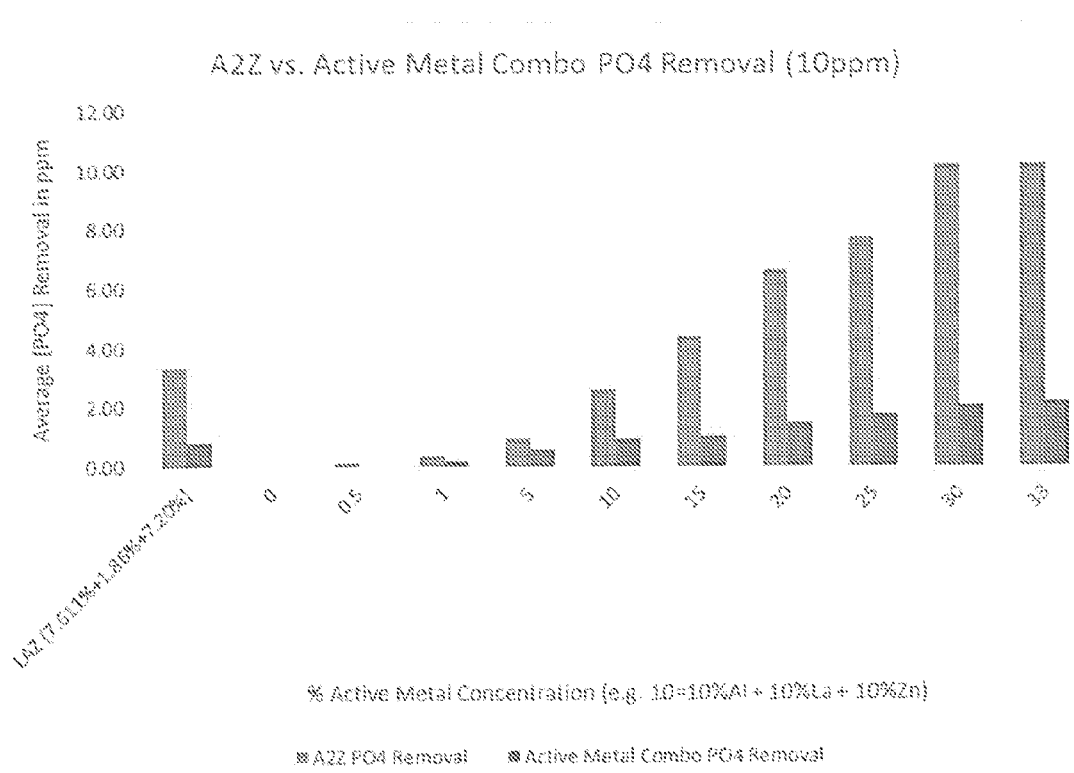
FIG. 2 is a chart showing the effectiveness of one embodiment of the present invention.

The invention relates to chemical compositions and methods of use for these compositions. In one embodiment, the composition includes a slurry of one or more compounds in water. Preferably, the compound contains a zinc compound, a lanthanum compound, and an aluminum compound. The invention is useful for removing impurities from any body of water, including swimming pools, spas, and hot tubs. Alternatively, it may also be used in smaller aqueous bodies, such as aquariums.

The methods disclosed herein include the use of a reagent which may be any of a number a zinc compounds, lanthanum compounds, and aluminum compounds. These compounds can be used to bind and remove phosphates such that the level of phosphate in the water being treated is about 50 parts per billion or less. At these levels, maintenance becomes far less work intensive. Preferably, the phosphates removed from the water through these processes are orthophosphates.

For purposes of this disclosure solubility refers to that characteristic of a compound defining the degree to which it dissociates to become molecularly or ionically dispersed in a solvent to form a true solution. Preferably, the solvent is water. Solubility of a substance is measured by the maximum amount that can be dissolved in a solvent at a given temperature and pressure.

In one embodiment, a zinc compound, a lanthanum compound, and an aluminum compound are added directly to the water. Preferably, the compound is in the form of a powder having particles of approximately 5-150 microns in size. The compound is added on the intake side of the filter, so that it is pumped toward the filter. For instance, the powder may be added to the pool's skimmers such that it is carried directly toward the filter.

As described, the preferable method is to place the zinc compound, lanthanum compound, and aluminum compound into the pool water system such that the compound is drawn into the filter. The compound may, for example, be added directly to one or more skimmers in a pool. The particles are then trapped by the filter. In this manner, water from the pool is continuously circulated over and around the compound particles. These particles are then able to react to form insoluble particles. On occasion, these particles may be removed from the filter by backwashing or other suitable means. In such instances, the backwashing acts as the last step in removing the phosphates from the pool.

These methods can be used to reduce undesirably elevated levels of phosphate as part of the water quality maintenance for a pool or other facility. The methods that have proved successful in treating elevated phosphate levels include first measuring the concentration of phosphate in the water. Water testing kits are commercially available to serve this purpose. Following this, the reagents in accordance with the present invention may be introduced to the water to be treated and the combination is allowed to react. Preferably, an excess of the stoichiometrically calculated equivalent of the compound necessary to treat the total amount of phosphate is added. Even more preferably, the amount of compound added is about 1.5 times the stoichiometrically calculated equivalent. Adding a predetermined amount of reactant compound is both cost effective in terms of reagent expense, and avoids the possibility of forming a fine, unfilterable composition which may be difficult to remove. This method is preferably employed only after algal growths have been treated with an appropriate sanitizer. The sanitizer, while not part of the invention disclosed herein, acts to kill the algae in the pool, thereby releasing into the water any phosphates the algae may contain. Algae are known to absorb a greater amount of phosphates than they require, through a process termed luxury uptake. For this reason, the phosphate levels are to be measured only after the algae have been killed, and all of the phosphates have thereby been released into the water.

In another embodiment of the invention, the compound may be placed in the water system and left there to react with the phosphates. This process can be repeated as necessary to maintain a low or relatively low phosphate concentration. Preferably this concentration is kept at or below 50 parts per billion. Again, the reagent is preferably placed so that it is drawn into the water filter. The reagent is preferably added in the form of either a slurry or a powder. Alternatively, it may be in a granulated form.

The reagent may also be constructed in the form of a pill or tablet. When in the form of a pill or tablet the reagent may be combined with any of a variety of binders. These binders may be inert or may include chemically active compounds. The pill or tablet may then be constructed so that it dissolves slowly over the course of a predetermined length of time. Alternatively, the pill or tablet may constructed using high pressure, as in the case of a mechanical press. In such instances, the reactive compound is exposed to high pressure over a predetermined length of time such that a pill or tablet is formed. Other methods of creating a pill or tablet from granulated or powdered compositions are similarly suited for use with the zinc compounds disclosed herein. In this embodiment, the compound within the pill or tablet is slowly released into the water to control phosphate levels over some greater time period without additional user intervention.

In yet another embodiment, the reagent-containing composition may be in the form of a tablet, powder, slurry, or it may be granulated.

In yet another embodiment, a pool or spa is treated with both a reagent to remove phosphates as well as an enzymatic cleaning or water clarifying solution. While compound serves chiefly the same purpose as previously indicated, the enzymatic solution or enzyme-based composition provides improved cleansing and water clarifying capabilities.

The preferred enzyme-based compositions are environmentally safe in that their components are natural products or are biodegradable. These compositions include a surfactant and a selected enzyme mixture. Preferably the surfactant in the composition is saponin, which may be present in the form of Yucca Extract from Yucca Schidigera.

The composition of this embodiment comprises an enzyme-based aqueous composition containing a minor amount of saponin. In particular, this embodiment relates to a composition containing a major amount of water and a minor amount of an active ingredient combination of an enzyme, saponin and a bacterial inhibiting stabilizer. In a preferred embodiment, the active ingredient combination comprises less than 50 percent by weight of the composition, and of that combination, a major amount is enzyme and a minor amount comprises the saponin and the bacterial inhibiting stabilizer. In more preferred embodiment, the active ingredient combination comprises from about 0.05 to about 10 weight percent of the composition, more preferably from about 1 to about 10 weight percent of the composition, the remainder being water. Of the active ingredient combination, about 99 to about 70 weight percent is enzyme and about 0.05 to about 30 weight percent is the saponin. Additionally, about 0.01 to about 10 weight percent of the composition may be a bacterial inhibiting stabilizer.

Suitable enzymes include the family of enzymes, e.g., lyase, isomerase, ligase, oxidoreductase, transferase and hydrolase. A desirable enzyme mixture includes lipase, .alpha.-amylase and protease activities. A preferable enzyme mixture is sold under the trade name Poolzyme by Natural Enzymes, Inc., of Cambellford, Ontario, Canada.

The bacterial inhibiting stabilizer for the cleaning and clarifying compositions can vary, depending upon the specific application for which the composition is designed. A matter to be considered is the pH of the enzyme solution that is modified by this invention. Generally, the enzyme solution is mildly acidic, typically having a pH ranging from about 3.5 to about 4.5. However, the solution can be alkaline, even to a pH of 10-11, regardless of the pH of the solution a suitable stabilizer must be included in order avoid bacterial growth and preserve the composition. Essentially, the stabilizer acts as a preservative.

A preferred enzymatic composition for spa use is formulated in the following manner: between 1.2 and 4 percent by weight of Poolzyme, an aqueous mixture of enzymes and surfactant is combined with between 0.2-0.8 percent of Yucca extract, sold by Brookside Agra, of Highland, and water is added to 100 L. Surcide P, is added as a bacterial inhibiting stabilizer and is sold by, Surfactants, Inc., of South Plumfield, N.J. This compound is added to a concentration of 0.12 kg per 100 L of solution.

A preferred enzymatic composition for pool use is formulated in the following manner: between 7 and 15 percent by weight of Poolzyme is combined with between 0.4-1.6 percent by weight of Yucca Extract and water is added to 100 L. Surcide P, is added as a bacterial inhibiting stabilizer to a concentration of 0.12 kg per 100 L of solution.

This enzymatic composition is then used in conjunction with the aforementioned phosphate scavenger. The result is a highly effective treatment method for pools, spas, and other suitable aqueous bodies. The combination of low phosphate levels and contaminant-free water results in a pool that has clean, clear, odor-free water. Such a condition is highly desirable for pool owners and users, and is achieved with relative ease using the methods and compositions taught herein. As previously indicated, in highly populated pools, the use of these methods can reduce pool maintenance up to 50 percent.

The following examples further illustrate and exhibit certain embodiments of the invention. These examples are provided in order to further clarify the invention and do not prescribe any limits, implied or otherwise, on the aforementioned methods and compositions.

Example 1

Phosphate is provided by adding the appropriate amount of stock phosphate solution to the above pool water (prepared by dissolving 0.2195 g of $KH_2PO_4$ in 1 L of DI water; 1 mL=0.05 gP). "Pool water" analysis: pH=7.7, alkalinity=120, hardness=388.

Typical procedure for measuring the phosphate removal ability of a product is as follows:
1) Make 4 L of "pool water".
2) Add the appropriate quantity of stock phosphate solution.
3) Stir well.
4) Pour out desired number of 1 L "pool water" samples and put them under a Phipps and Bird six place stirrer.
5) Stir well.
6) Test for initial phosphate on filtered pool water blank (first using the 25 micron retention filter paper and then a second pass thru a 0.45 micron membrane filter paper). This will remove any small quantity of phosphate present and obtain initial phosphate concentration levels.

Phosphate analyses are done using test numbers 78 and 79 of the LaMotte Smart 2 colorimeter analysis and reagent system. Initial and final phosphate concentration levels were obtained by following the instructions for each test number in the LaMotte Smart 2 Operator's Manual. The LaMotte phosphate testing analysis was used up through Jan. 3, 2012.

From Jan. 3, 2012 the Genesys 20 Visible Spectrophotometer was used for phosphate testing analysis. The Genesys 20 Visible Spectrophotometer was set to measure phosphate absorbency. A line graph was used to translate absorbency to ppm phosphate levels. Known phosphate concentration standards were tested for absorbency in the Genesys 20 Visible Spectrophotometer. The x-axis of the line graph measured absorbance and the y-axis measure ppm. The known phosphate concentration standards and their absorbance levels were then graphed. A best fit line was then drawn to obtain further phosphate ppm concentration levels from the absorbency readings on the Genesys 20 Visible Spectrophotometer, 7) Prepare a 1% solution of Zinc salt (or other precipitant).
   1 mL of a 1% soln. per liter=10 ppm
8) Start the stirrer at 100 RPM and add the appropriate quantity of precipitant solution to each 1 L beaker.
9) After two minutes, reduce the stirrer speed to 20 RPM for ten minutes.
10) After mixing samples, filter through the 25 and 0.45 micron retention filter papers to remove all of the solids and run the phosphate concentration analysis as described in Step 6 to obtain final phosphate levels.

Results can be seen in Tables 1 and 2 below:

TABLE 1

| | | | | | | | | |
|---|---|---|---|---|---|---|---|---|
| | | | $ZnSO_4*H_2O$ | | | | | |
| | | | Reagent Grade | | | | Amrex | |
| | | | LaMotte | Genesys20 | | | LaMotte | Genesys20 |
| | | PO4(i) ppm | 1.34 | 1.25 | | PO4(i) ppm | 1.16 | 1.175 |
| | | | PO4 (f) ppm | | | | PO4 (f) ppm | |
| Jan. 3, 2012 | $ZnSO_4*H_2O$ dosage | 40 ppm | 0.19 | 0.10 | $ZnSO_4*H_2O$ dosage | 40 ppm | 0.19 | 0.1375 |
| | | 60 ppm | 0.06 | 0.02 | | 60 ppm | 0.04 | 0.05 |
| | | 80 ppm | 0.06 | 0.00 | | | | |
| | | | | | | | Amrex | |
| | | | | | | | LaMotte | Genesys20 |
| | | | | | | PO4(i) ppm | 1.10 | 1.05 |
| | | | | | | | PO4 (f) ppm | |
| | | | | | $ZnSO_4*H_2O$ dosage | 80 ppm | 0.02 | 0.001 |
| | | | LaMotte | | | | LaMotte | |
| | | PO4(i) ppm | 1.00 | | | PO4(i) ppm | 1.07 | |
| | | | PO4 (f) ppm | | | | PO4 (f) ppm | |
| Jul. 12, 2011 | $ZnSO_4*H_2O$ dosage | 20 ppm | 0.22 | Jul. 13, 2011 | $ZnSO_4*H_2O$ dosage | 25 ppm | 0.32 | |
| | | 40 ppm | 0.06 | | | 30 ppm | 0.29 | |
| | | 60 ppm | 0.01 | | | 35 ppm | 0.18 | |
| | | 80 ppm | 0.04 | | | 40 ppm | 0.17 | |

TABLE 1-continued

| | | | ZnSO4*H2O | | | |
|---|---|---|---|---|---|---|
| | | LaMotte | | | LaMotte | |
| | | PO4(i) ppm | 1.01 | | PO4(i) ppm | 1.07 |
| | | | PO4 (f) ppm | | | PO4 (f) ppm |
| Jul. 12, 2011 | ZnSO4*H2O dosage | 25 ppm | 0.16 | Jul. 14, 2011 | 25 ppm | 0.29 |
| | | 30 ppm | 0.26/0.18** | ZnSO4*H2O dosage | 30 ppm | 0.18 |
| | | 35 ppm | 0.02 | | 35 ppm | 0.13 |
| | | 40 ppm | 0.00 | | 40 ppm | 0.09 |
| | | LaMotte | | | LaMotte | |
| | | PO4(i) ppm | 0.98 | | PO4(i) ppm | 12.70 |
| | | | PO4 (f) ppm | | | PO4 (f) ppm |
| Jul. 14, 2011 | ZnSO4*H2O dosage | 35 ppm | 0.20 | Oct. 4, 2011 | 40 ppm | 4.90 |
| | | 40 ppm | 0.12 | ZnSO4*H2O dosage | 60 ppm | 4.00 |
| | | 45 ppm | 0.15 | | 80 ppm | 3.20 |
| | | 50 ppm | 0.10 | | | |
| | | LaMotte | | | LaMotte | |
| | | PO4(i) ppm | 12.70 | | PO4(i) ppm | 11.30 |
| | | | PO4 (f) ppm | | | PO4 (f) ppm |
| Oct. 4, 2011 | ZnSO4*H2O dosage | 80 ppm | 2.80 | Oct. 13, 2011 | 80 ppm | 1.50 |
| | | 100 ppm | 2.00 | ZnSO4*H2O dosage (41.4% solids) | 60 ppm | 2.30 |
| | | | | | 40 ppm | 2.90 |
| | | LaMotte | | | LaMotte | |
| | | PO4(i) ppm | 11.90 | | PO4(i) ppm | 1.50 |
| | | | PO4 (f) ppm | | | PO4 (f) ppm |
| Oct. 13, 2011 | ZnSO4*H2O dosage (41.4% solids) | 80 ppm | 1.30 | Oct. 18, 2011 | 20 ppm | 1.40 |
| | | 100 ppm | 1.00 | ZnSO4*H2O dosage | 30 ppm | 1.00 |
| | | 120 ppm | 1.10 | | 40 ppm | 0.70 |
| | | LaMotte | | | LaMotte | |
| | | PO4(i) ppm | 1.40 | | PO4(i) ppm | 1.90 |
| | | | PO4 (f) ppm | | | PO4 (f) ppm |
| Oct. 18, 2011 | ZnSO4*H2O dosage | 20 ppm | 0.70 | Oct. 19, 2011 | 20 ppm | 1.60 |
| | | 30 ppm | 1.10 | ZnSO4*H2O dosage | 30 ppm | 0.90 |
| | | 40 ppm | 0.90 | | 40 ppm | 0.90 |
| | | | | | 50 ppm | 1.10 |

(i) = Initial PO4 level
(f) = final PO4 level
**Retested PO4

TABLE 2

| | | | ZnCl2 (62.5% solids*) | | | |
|---|---|---|---|---|---|---|
| | | | Genesys20 | | | Genesys20 |
| | | PO4 (i) ppm | 1.15 | | PO4 (i) ppm | 1.25 |
| | | | PO4 (f) ppm | | | PO4 (f) ppm |
| Jan. 4, 2012 | ZnCl2 dry dosage | 40 ppm | 0.06 | Jan. 4, 2012 | ZnCl2 dry dosage | 20 ppm | 0.59 |
| | | 60 ppm | 0.025 | | 30 ppm | 0.31 |
| | | 80 ppm | 0.00 | | | |
| | | | Genesys20 | | | Genesys20 |
| | | PO4 (i) ppm | 11.76 | | PO4 (i) ppm | 13.75 |
| | | | PO4 (f) ppm | | | PO4 (f) ppm |
| Jan. 4, 2012 | ZnCl2 dry dosage | 80 ppm | 0.55 | Jan. 4, 2012 | ZnCl2 dry dosage | 40 ppm | 2.20 |
| | | 100 ppm | 0.413 | | 60 ppm | 1.10 |
| | | 120 ppm | 0.31 | | | |

TABLE 2-continued

| | | | ZnCl2 (62.5% solids*) | | | | |
|---|---|---|---|---|---|---|---|
| | | PO4 (i) ppm | LaMotte 1.50 | | | PO4 (i) ppm | LaMotte 1.30 |
| Nov. 7, 2012 | ZnCl2 dry dosage | 30 ppm 40 ppm 50 ppm | PO4 (f) ppm 0.20 0.20 0.40 | Nov. 8, 2012 | ZnCl2 dry dosage | 40 ppm 50 ppm 60 ppm | PO4 (f) ppm 0.60 0.90 0.90 |
| | | PO4 (i) ppm | LaMotte 10.20 | | | PO4 (i) ppm | LaMotte 1.50 |
| Nov. 7, 2012 | ZnCl2 dry dosage | 60 ppm 80 ppm 100 ppm 40 ppm | PO4 (f) ppm 1.00 1.10 0.70 1.90 | Nov. 8, 2012 | ZnCl2 dry dosage | 40 ppm 50 ppm 60 ppm | PO4 (f) ppm 0.40 0.20 0.40 |
| | | PO4 (i) ppm | LaMotte 1.60 | | | | |
| Oct. 14, 2012 | ZnCl2 | 24 ppm 30 ppm 36 ppm | PO4 (f) ppm 0.10 0.40 0.20 | | | | |

*Information supplied by Amrex
(i) = initial PO4 level
(f) = final PO4 level

Example 2

Removal of Orthophosphate from Water(s) Using Zinc Ions.

A Cove hot tub, similar to that manufactured by Nordic Products, Inc., as their Crown II with a stated capacity of 275-300 gallons (1041-1135 liters) was used as the test tank. At a given pump rate of 90 gallons a minute, the turn-over rate in the hot tub was about three minutes. The tub was fitted with a heater, allowing for the maintenance of a temperature of about 85 degrees F.

The tub was equipped with a cartridge filter. The filter elements were replaced prior to each test. The filter elements were designated as Waterway FC-2375, having an area of 25 square feet.

At the beginning of the test, the tub was filled with approximately 1100 liters of tap water, having the following typical analysis:
Hardness, mg/L as calcium carbonate—100
Chlorine, mg/L—less than 0.1
pH—7.2.
Alkalinity, mg/L as calcium carbonate—100
Cyanuric acid, mg/L—less than 30

Pool water chemistry analyses were performed using Aquacheck 7 test strips, available from the Hach Company, pH was done in the lab on the Orion 310 pH meter and phosphate and zinc analyses were done on the LaMotte Smart 3 colorimeter and the 20 Genesys Spectrometer.

No effort was made to adjust the water quality parameters; it was thought that since the water would be changed frequently, no concern was necessary regarding sanitization, scaling, or corrosion. Once the water had come to temperature, 14.7 grams of trisodium phosphate were added, to bring the phosphate ion concentration up to 8.1 mg/L. After four hours of circulation and after confirmation that the phosphate level was correct, 90.7 grams of zinc chloride solution supplied by a distributer and representing 56.9 grams of 100% zinc chloride were added. The next morning, the residual phosphate level was 0.7 mg/L, 3 days later; the phosphate level was 0.06 mg/L.

Example 3

The same experimental guidelines that were described in Example 2 were followed except that the initial phosphate level was 0.27 mg/L and 13.6 grams of zinc chloride solution, representing 5.3 grams of dry zinc chloride were added. After four days, the residual phosphate level was 0.10 mg/L.

Example 4

The same experiment as that described in Example 2 was performed, under the same conditions, except that the initial phosphate concentration was 1.8 mg/L and 20.9 grams of zinc sulfate were added. After one day, the residual phosphate concentration was 0.08 mg/L.

Example 5

A 16,000 gallon in-ground pool was fitted with a Hayward 10-2702 Max-Flo II pump, having a pump capacity of 40 GPM.

A cartridge filter, Hayward 05-360, C3030 Swimclear, containing four Hayward filter cartridges (C-580-E), each having a filter area of 81 square feet, thus providing a filter area of 325 square feet, was installed downstream of the pump.

Water remaining in the pool from the previous year was analyzed using an Orion 310 pH meter, LaMotte Smart 3 procedures for phosphate and zinc analyses, and Hach Aquacheck 7 test strips for all other parameters. Beginning conditions were: Hardness, as mg/L calcium carbonate 150, pH 8.4, Chlorine—none, Alkalinity, as calcium carbonate, mg/L—150, cyanuric acid, mg/L—40.

The water was adjusted, with final analyses as follows:
Hardness, as mg/L—200, Chlorine, mg/L—3, pH—7.6 Alkalinity, mg/L—100, Cyanuric Acid, mg/L—less than 30, Phosphate, mg/L—8.5, Zinc, mg/L—0.6. 4835.4 grams of 62.5% zinc chloride solution (from a distributer) which equates to 50 mg/L dry zinc chloride, were added.

Three days later 7.83 mg/L phosphate was removed.

Example 6

The same experiment as in Example 5 was performed, under the same conditions, except that the initial phosphate level was 0.28 mg/L and the zinc chloride solution dose was 347.6 grams which equates to 217.3 grams of dry product. Two days later, the phosphate level was 0.18 mg/L and at the end of five days the phosphate level was 0.09 mg/L (0.19 mg/L removed).

Example 7

A 15,000 gallon pool, fitted with a 1 HP centrifugal pump and a diatomaceous earth filter, designated as a Pentair Sta-Rite Dynaglass FNS-60, having a surface area of 60 square feet, plumbed downstream from the pump. Initial water quality conditions were:

Hardness, mg/L as calcium carbonate—150

Chlorine, mg/L—3 pH—8.0

Alkalinity, mg/L as Calcium carbonate—150

Cyanuric acid, mg/L—75

Phosphate, mg/L—6.0

3646.8 grams of zinc chloride solution equal to 2279.3 grams dry product, were added. Seven days later 5.51 mg/L phosphate was removed.

These experiments demonstrate that zinc compounds effectively react with phosphates in conditions similar to those encountered in swimming pools. As previously noted, the reaction product is zinc phosphate, an insoluble compound which may then be removed using various known filtration methods.

Example 8

The following tests were performed in the laboratory with an 110V 6 place Phipps and Bird Inc, mechanical stirrer at 20 rpm continuously for 48 hours. Using 1500 mL beakers which contained a volume of 1000.00 grams (weighed using a Mettler Toledo XA5002S balance) of pool water taken from a recreational private use 16,000 gallon in ground test pool. The ranges for pool constituents such as total chlorine (1-3 ppm), total alkalinity (80-120 ppm), pH (7.2-7.8), and total hardness (250-500 ppm) and cyanuric acid (30-50 ppm) were checked using HACH AquaChek 7 pool and spa test strips (serial #9094401236) before and after each 48 hour test to ensure that the solutions added were not interfering with other pool constituents. The three dose concentrations were weighed out using a Mettler Toledo XA50025, the solution was added drop wise until the correct weight was reached. To avoid confusion the product listed on the side of each Table is the percent active metal in that formula, all solutions were made using DI water. Once the product solution was present in the beaker, the paddle of the Phipps and Bird Inc. stirrer was placed in the center of the beaker. The dose concentration can be seen in green/shaded brackets in each table.

The measurements were taken using a LaMotte Smart 3 Colorimeter to measure the low range [PO4] in the solution. The instrument was calibrated (as per the directions in the owner's manual) using phosphate standards prior to every 24 hour, and 48 hour test to ensure validity in the testing procedure. Once the 48 hour test was complete, the beakers were cleaned using DI water and Palmolive dish soap, to reduce contamination. The six place stirrer was also cleaned, dried and rinsed in DI water to reduce contamination.

TABLE 3

Active Metals Comparison Test 1

| Product | In ppm Initial [PO4] | Intermediate [PO4] 24 hours | Dose Rate = 0.0469 g Final [PO4] (48 hours) | In ppm [PO4] Removal | [PO4] rem.-Control |
|---|---|---|---|---|---|
| Control | 1.03 | 1.03 | 1.00 | 0.03 | 0.00 |
| 7.611 La | 1.03 | 0.61 | 0.21 | 0.82 | 0.79 |
| 1.86 Al | 1.03 | 1.02 | 1.01 | 0.02 | −0.01 |
| 7.20 Zn | 1.03 | 0.99 | 0.95 | 0.08 | 0.05 |
|  |  |  | total | 0.92 | 0.89 |
| ZLA (7.611 + 1.86 + 7.20) | 1.03 | 0.09 | 0.02 | 1.01 | 0.98 |

| Product | In ppm Initial [PO4] | Intermediate [PO4] 24 hours | Dose Rate = 0.0937 g Final [PO4] (48 hours) | In ppm [PO4] Removal | [PO4] rem.-Control |
|---|---|---|---|---|---|
| Control | 1.08 | 1.08 | 1.06 | 0.02 | 0.00 |
| 7.611 La | 1.08 | 0.67 | 0.31 | 0.77 | 0.75 |
| 1.86 Al | 1.08 | 1.08 | 1.04 | 0.04 | 0.02 |
| 7.20 Zn | 1.08 | 1.05 | 0.98 | 0.10 | 0.08 |
|  |  |  | total | 0.91 | 0.89 |
| ZLA (7.611 + 1.86 + 7.20) | 1.08 | 0.05 | 0.02 | 1.06 | 1.04 |

| Product | In ppm Initial [PO4] | Intermediate [PO4] 24 hours | Dose Rate = 0.1874 g Final [PO4] (48 hours) | In ppm [PO4] Removal | [PO4] rem.-Control |
|---|---|---|---|---|---|
| Control | 1.07 | 1.07 | 1.07 | 0.00 | 0.00 |
| 7.611 La | 1.07 | 0.79 | 0.23 | 0.84 | 0.84 |
| 1.86 Al | 1.07 | 1.04 | 1.01 | 0.06 | 0.06 |
| 7.20 Zn | 1.07 | 1.00 | 0.92 | 0.15 | 0.15 |
|  |  |  | total | 1.01 | 1.01 |
| ZLA (7.611 + 1.86 + 7.20) | 1.07 | 0.00 | 0.00 | 1.07 | 1.07 |

Table 3: When viewing the table above, compare the sum of the individual metal concentrations versus the combined concentration.

TABLE 4

Active Metals Comparison Test 2

| Product | In ppm Initial [PO4] | Intermediate [PO4] 24 hours | Dose Rate = 0.0469 g Final [PO4] (48 hours) | In ppm [PO4] Removal | [PO4] removed- Control |
|---|---|---|---|---|---|
| Control | 0.99 | 0.99 | 0.96 | 0.03 | 0.00 |
| 7.611 La | 0.99 | 0.57 | 0.13 | 0.86 | 0.83 |
| 1.86 Al | 0.99 | 0.99 | 0.99 | 0.00 | −0.03 |
| 7.20 Zn | 0.99 | 0.95 | 0.89 | 0.10 | 0.07 |
| | | | total | 0.96 | 0.93 |
| ZLA (7.611 + 1.86 + 7.20) | 0.99 | 0.13 | 0.02 | 0.97 | 0.94 |

| Product | In ppm Initial [PO4] | Intermediate [PO4] 24 hours | Dose Rate = 0.0937 g Final [PO4] (48 hours) | In ppm [PO4] Removal | [PO4] removed- Control |
|---|---|---|---|---|---|
| Control | 1.13 | 1.13 | 1.13 | 0.00 | 0.00 |
| 7.611 La | 1.13 | 0.63 | 0.32 | 0.81 | 0.81 |
| 1.86 Al | 1.13 | 1.13 | 1.09 | 0.04 | 0.04 |
| 7.20 Zn | 1.13 | 1.01 | 1.03 | 0.10 | 0.10 |
| | | | total | 0.95 | 0.95 |
| ZLA (7.611 + 1.86 + 7.20) | 1.13 | 0.05 | 0.04 | 1.10 | 1.10 |

| Product | In ppm Initial [PO4] | Intermediate [PO4] 24 hours | Dose Rate = 0.1874 g Final [PO4] (48 hours) | In ppm [PO4] Removal | [PO4] removed- Control |
|---|---|---|---|---|---|
| Control | 1.03 | 1.03 | 1.03 | 0.00 | 0.00 |
| 7.611 La | 1.03 | 0.75 | 0.23 | 0.80 | 0.80 |
| 1.86 Al | 1.03 | 1.04 | 1.01 | 0.02 | 0.02 |
| 7.20 Zn | 1.03 | 1.00 | 0.06 | 0.11 | 0.11 |
| | | | total | 0.97 | 0.97 |
| ZLA (7.611 + 1.86 + 7.20) | 1.03 | 0.06 | 0.00 | 1.03 | 1.03 |

Table 4: The table above is an identical test to Table 1, to remove uncertainty and error of the measured values.

TABLE 5

Active Metals Comparison Average

| Product | In ppm Initial [PO4] | Intermediate [PO4] 24 hours | Dose Rate = 0.0469 g Final [PO4] (48 hours) | In ppm [PO4] Removal | [PO4]- Control |
|---|---|---|---|---|---|
| Control | 1.01 | 1.01 | 0.98 | 0.03 | 0.00 |
| 7.611 La | 1.01 | 0.59 | 0.17 | 0.84 | 0.81 |
| 1.86 Al | 1.01 | 1.00 | 1.00 | 0.01 | −0.02 |
| 7.20 Zn | 1.01 | 0.97 | 0.92 | 0.09 | 0.06 |
| | | | total | 0.97 | 0.94 |
| ZLA (7.611 + 1.86 + 7.20) | 1.01 | 0.11 | 0.02 | 0.99 | 0.96 |

| Product | In ppm Initial [PO4] | Intermediate [PO4] 24 hours | Dose Rate = 0.0937 g Final [PO4] (48 hours) | In ppm [PO4] Removal | [PO4]- Control |
|---|---|---|---|---|---|
| Control | 1.11 | 1.11 | 1.10 | 0.01 | 0.00 |
| 7.611 La | 1.11 | 0.65 | 0.32 | 0.79 | 0.78 |
| 1.86 Al | 1.11 | 1.11 | 1.07 | 0.04 | 0.03 |
| 7.20 Zn | 1.11 | 1.03 | 1.01 | 0.10 | 0.09 |
| | | | total | 0.94 | 0.93 |
| ZLA (7.611 + 1.86 + 7.20) | 1.11 | 0.05 | 0.03 | 1.08 | 1.07 |

TABLE 5-continued

| | Active Metals Comparison Average | | | | |
|---|---|---|---|---|---|
| Product | In ppm Initial [PO4] | Intermediate [PO4] 24 hours | Dose Rate = 0.1874 g Final [PO4] (48 hours) | In ppm [PO4] Removal | [PO4]- Control |
| Control | 1.05 | 1.05 | 1.05 | 0.00 | 0.00 |
| 7.611 La | 1.05 | 0.77 | 0.23 | 0.82 | 0.82 |
| 1.86 Al | 1.05 | 1.04 | 1.01 | 0.04 | 0.04 |
| 7.20 Zn | 1.05 | 1.00 | 0.92 | 0.13 | 0.13 |
| | | | total | 0.99 | 0.99 |
| ZLA (7.611 + 1.86 + 7.20) | 1.05 | 0.06 | 0.00 | 1.05 | 1.05 |

Table 5: Above; is the average of Table 1 & Table 2. When viewing the table, compare the ZLA combination versus each individual metal.

Example 9

Data was collected at 1, 5, and 10 ppm initial phosphate level(s) and compared the sum of the active metals to the same percentage of active metals in the A2Z formula. As seen in Table 6 the active metal concentration is 15.00% active for each metal, therefore the sum of the active metals are 45.00%.

We had 5 beakers (labeled A-E) with 5.18 ppm PO4 standard in each, we dosed each beaker with 46.9 ppm active metal (dose is indicated in the bright green box). Three dose rates were selected for variance and correlation purposes 46.9 ppm, 93.7 ppm, and 187.4 ppm. Choosing 46.9 ppm; Beaker A was a control which had a 5.18 ppm initial and final concentration; because no phosphate removal agent was added to this beaker. Beaker B had an initial PO4 level of 5.18 ppm however 46.9 ppm of 15.00% active Lanthanum (La) metal was added to the beaker to get a PO4 removal (over a 48 hour period) of 0.63 ppm. Beaker C contained the same initial PO4 level, and also 46.9 ppm of 15.00% active Aluminum (Al) to get 0.12 ppm PO4 removal over the same duration. Beaker D was the same as the previous beakers (initial PO4, dose rate, active metal concentration) except the active metal which is Zinc (Zn) and the removal rate is 0.17 ppm. The scope of this application is to compare the A2Z PO4 removal Beaker E & the blue box 2.45 ppm) vs, the sum of the active metals PO4 removal rate (red box 0.92 ppm). The idea is that the sum of the metals should remove ideally (stoichiometrically) a certain amount of PO4, however the A2Z formula should be the same or relatively close, however this is not the case. The interesting part of this project is that each individual metal has been administered at a 46.9 ppm dose; therefore the sum of the three metals is at a 140.7 ppm dose vs. the 1 A2Z dose at 46.9, the sum of the individual metals should be greater than the A2Z PO4 removal.

| Natural Chemistry Product | Feb. 9, 2015 In ppm Initial [PO4] | Phosphate Removal Intermediate [PO4] 24 hours | 15.00% active Dose rate = 46.9 ppm Final [PO4] (48 hours) | In ppm [PO4] Removal | | |
|---|---|---|---|---|---|---|
| Control | 5.18 | 5.18 | 5.18 | 0.00 | | |
| 15.00% La | 5.18 | 4.60 | 4.55 | 0.63 | | |
| 15.00% Al | 5.18 | 5.09 | 5.06 | 0.12 | | |
| 15.00% Zn | 5.18 | 5.05 | 5.01 | 0.17 | | |
| | | | combine metal total | 0.92 | 1.685 | 90.801 |
| 45.00% A2Z (15.00% La, 15.00% Al, 15.00% Zn) | 5.18 | 2.88 | 2.73 | 2.45 | 166.304 | |

| Product | In ppm Initial [PO4] | Intermediate [PO4] 24 hours | Dose Rate = 93.7 ppm Final [PO4] (48 hours) | In ppm [PO4] Removal | | |
|---|---|---|---|---|---|---|
| Control | 5.18 | 5.18 | 5.18 | 0.00 | | |
| 15.00% La | 5.18 | 4.52 | 4.50 | 0.68 | | |
| 15.00% Al | 5.18 | 5.09 | 5.04 | 0.14 | | |
| 15.00% Zn | 5.18 | 5.03 | 4.99 | 0.19 | | |
| | | | combined metal total | 1.01 | 2.31 | 112.554 |
| 45.00% A2Z (15.00% La, 15.00% Al, 15.00% Zn) | 5.18 | 1.63 | 1.57 | 3.61 | 257.426 | |

Table 6 Section of the 15% active data set. The comparison between the sum of individual active metals and A2Z P04 removed at various dose rates are seen.

TABLE 8 shows the improvement of the A2Z formulation over the PO4 removal shown when combining the PO4 removal of the individual active metals.

| % active metal concentrations | Average A2Z | Average Combo | (Average of all 3 tests in that experiment 46.9, 93.7, and 187.4 ppm) Ave. | % improv. | % diff. |
|---|---|---|---|---|---|
| LAZ (7.611% + 1.86% + 7.20%) | 3.3466 | 0.8400 | 2.0933 | 298.4048 | 119.7439 |
| 10.00 | 2.6030 | 0.9700 | 1.7865 | 168.3505 | 91.40778 |
| 15.00 | 4.4000 | 1.0330 | 2.7165 | 325.9439 | 123.9463 |
| 20.00 | 6.6360 | 1.4966 | 4.0663 | 343.4051 | 126.3901 |
| 25.00 | 7.7466 | 1.7500 | 4.7483 | 342.6629 | 126.2894 |
| 30.00 | 10.1930 | 2.0660 | 6.1295 | 393.3688 | 132.5883 |
| 33.33 | 10.2300 | 2.1733 | 6.2017 | 370.7062 | 129.9114 |

Table 8 shows the improvement of the A2Z formulation over the P04 removal shown when combining the P04 removal of the individual active metals.

| Natural Chemistry Mar. 2, 2015 Phosphate Removal 0.50% active | | | | | | | |
|---|---|---|---|---|---|---|---|
| Product | In ppm Initial [PO4] | Intermediate [PO4] 24 hours | Dose rate = 46.9 ppm Final [PO4] (48 hours) | In ppm [PO4] Removal | | | |
| Control | 10.10 | 10.10 | 10.1 | 0 | | | |
| 0.50% La | 10.10 | 10.10 | 10.1 | 0 | | | |
| 0.50% Al | 10.10 | 10.10 | 10.1 | 0 | | | |
| 0.50% Zn | 10.10 | 10.10 | 10.1 | 0 | | | |
| | | | combined metal total | 0 | 0.03 | 200 | |
| 1.50 A2Z(0.50% La, 0.50% Al, 0.50% Zn) | 10.10 | 10.05 | 10.04 | 0.06 | 0 | | |
| Product | In ppm Initial [PO4] | Intermediate [PO4] 24 hours | Dose Rate = 93.7 ppm Final [PO4] (48 hours) | In ppm [PO4] Removal | | | |
| Control | 10.10 | 10.10 | 10.1 | 0 | | | |
| 0.50% La | 10.10 | 10.08 | 10.08 | 0.02 | | | |
| 0.50% Al | 10.10 | 10.10 | 10.1 | 0 | | | |
| 0.50% Zn | 10.10 | 10.10 | 10.1 | 0 | | | |
| | | | combined metal total | 0.02 | 0.075 | 146.6667 | |
| 1.50 A2Z(0.50% La, 0.50% Al, 0.50% Zn) | 10.10 | 10.01 | 9.97 | 0.13 | 550 | | |
| Product | In ppm Initial [PO4] | Intermediate [PO4] 24 hours | Dose Rate = 187.4 ppm Final [PO4] (48 hours) | In ppm [PO4] Removal | | | |
| Control | 10.10 | 10.10 | 10.1 | 0 | | | |
| 0.50% La | 10.10 | 10.05 | 10.05 | 0.05 | | | |
| 0.50% Al | 10.10 | 10.10 | 10.1 | 0 | | | |
| 0.50% Zn | 10.10 | 10.10 | 10.09 | 0.01 | | | |
| | | | combined metal total | 0.06 | 0.12 | 100 | |
| 1.50 A2Z(0.50% La, 0.50% Al, 0.50% Zn) | 10.10 | 9.93 | 9.92 | 0.18 | 200 | | |

Table 9 shows the effectiveness of A2Z at 0.5% concentration of each of the metals.

| Natural Chemistry Mar. 4, 2015 Phosphate Removal 1.00% active | | | | |
|---|---|---|---|---|
| Product | In ppm Initial [PO4] | Intermediate [PO4] 24 hours | Dose rate = 46.9 ppm Final [PO4] (48 hours) | In ppm [PO4] Removal |
| Control | 10.89 | 10.89 | 10.89 | 0 |
| 1.00% La | 10.89 | 10.81 | 10.81 | 0.08 |

Natural Chemistry Mar. 4, 2015 Phosphate Removal 1.00% active

| | | | | | | |
|---|---|---|---|---|---|---|
| 1.00% Al | 10.89 | 10.89 | 10.87 | 0.02 | | |
| 1.00% Zn | 10.89 | 10.89 | 10.86 | 0.03 | | |
| | | | combined metal total | 0.13 | 0.17 | 47.05882 |
| 3.00% A2Z(1.00% La, 1.00% Al, 1.00% Zn) | 10.89 | 10.78 | 10.68 | 0.21 | 61.53846 | |

| Product | In ppm Initial [PO4] | Intermediate [PO4] 24 hours | Dose Rate = 93.7 ppm Final [PO4] (48 hours) | In ppm [PO4] Removal | | |
|---|---|---|---|---|---|---|
| Control | 10.89 | 10.89 | 10.89 | 0 | | |
| 1.00% La | 10.89 | 10.76 | 10.74 | 0.15 | | |
| 1.00% Al | 10.89 | 10.85 | 10.85 | 0.04 | | |
| 1.00% Zn | 10.89 | 10.84 | 10.84 | 0.05 | | |
| | | | combined metal total | 0.24 | 0.32 | 50 |
| 3.00% A2Z(1.00% La, 1.00% Al, 1.00% Zn) | 10.89 | 10.51 | 10.49 | 0.4 | 66.66667 | |

| Product | In ppm Initial [PO4] | Intermediate [PO4] 24 hours | Dose Rate = 187.4 ppm Final [PO4] (48 hours) | In ppm [PO4] Removal | | |
|---|---|---|---|---|---|---|
| Control | 10.89 | 10.89 | 10.89 | 0 | | |
| 1.00% La | 10.89 | 10.73 | 10.72 | 0.17 | | |
| 1.00% Al | 10.89 | 10.84 | 10.83 | 0.06 | | |
| 1.00% Zn | 10.89 | 10.85 | 10.83 | 0.06 | | |
| | | | combined metal total | 0.29 | 0.385 | 49.35065 |
| 3.00% A2Z(1.00% La, 1.00% Al, 1.00% Zn) | 10.89 | 10.43 | 10.41 | 0.48 | 65.51724 | |

Table 10 shows the effectiveness of A2Z at 1% concentration of each of the metals.

Natural Chemistry Mar. 4, 2015 Phosphate Removal 5.00% active

| Product | In ppm Initial [PO4] | Intermediate [PO4] 24 hours | Dose rate = 46.9 ppm Final [PO4] (48 hours) | In ppm [PO4] Removal | | |
|---|---|---|---|---|---|---|
| Control | 10.04 | 10.04 | 10.04 | 0.00 | | |
| 5.00% La | 10.04 | 9.90 | 9.88 | 0.16 | | |
| 5.00% Al | 10.04 | 9.99 | 9.99 | 0.05 | | |
| 5.00% Zn | 10.04 | 9.99 | 9.98 | 0.06 | | |
| | | | combined metal total | 0.27 | 0.4 | 65 |
| 15.00% A2Z(5.00% La, 5.00% Al, 5.00% Zn) | 10.04 | 9.55 | 9.51 | 0.53 | 96.2963 | |

| Product | In ppm Initial [PO4] | Intermediate [PO4] 24 hours | Dose Rate = 93.7 ppm Final [PO4] (48 hours) | In ppm [PO4] Removal | | |
|---|---|---|---|---|---|---|
| Control | 10.04 | 10.04 | 10.04 | 0 | | |
| 5.00% La | 10.04 | 9.72 | 9.71 | 0.33 | | |
| 5.00% Al | 10.04 | 9.86 | 9.85 | 0.19 | | |
| 5.00% Zn | 10.04 | 9.85 | 9.84 | 0.2 | | |
| | | | combined metal total | 0.72 | 0.885 | 37.28814 |
| 15.00% A2Z(5.00% La, 5.00% Al, 5.00% Zn) | 10.04 | 9.01 | 8.99 | 1.05 | 45.83333 | |

| Product | In ppm Initial [PO4] | Intermediate [PO4] 24 hours | Dose Rate = 187.4 ppm Final [PO4] (48 hours) | In ppm [PO4] Removal | | |
|---|---|---|---|---|---|---|
| Control | 10.04 | 10.04 | 10.04 | 0 | | |
| 5.00% La | 10.04 | 9.81 | 9.62 | 0.42 | | |
| 5.00% Al | 10.04 | 9.88 | 9.83 | 0.21 | | |
| 5.00% Zn | 10.04 | 9.90 | 9.81 | 0.23 | | |
| | | | combined metal total | 0.86 | 1.065 | 38.49765 |
| 15.00% A2Z(5.00% La, 5.00% Al, 5.00% Zn) | 10.04 | 8.89 | 8.77 | 1.27 | 47.67442 | |

Table 11 shows the effectiveness of A2Z at 5% concentration of each of the metals.

| Natural Chemistry Mar. 9, 2015 Phosphate Removal 10.00% active | | | | | | | |
|---|---|---|---|---|---|---|---|
| Product | In ppm Initial [PO4] | Intermediate [PO4] 24 hours | Dose rate = 46.9 ppm Final [PO4] (48 hours) | In ppm [PO4] Removal | | | |
| Control | 10.16 | 10.16 | 10.16 | 0 | | | |
| 10.00% La | 10.16 | 9.55 | 9.55 | 0.61 | | | |
| 10.00% Al | 10.16 | 10.05 | 10.02 | 0.14 | | | |
| 10.00% Zn | 10.16 | 10.00 | 9.97 | 0.19 | | | |
| | | | combined metal total | 0.94 | 1.555 | | 79.09968 |
| 30.00% A2Z(10.00% La, 10.00% Al, 10.00% Zn) | 10.16 | 8.32 | 7.99 | 2.17 | 130.8511 | | |
| Product | In ppm Initial [PO4] | Intermediate [PO4] 24 hours | Dose Rate = 93.7 ppm Final [PO4] (48 hours) | In ppm [PO4] Removal | | | |
| Control | 10.16 | 10.16 | 10.16 | 0 | | | |
| 10.00% La | 10.16 | 9.63 | 9.54 | 0.62 | | | |
| 10.00% Al | 10.16 | 10.09 | 10.03 | 0.13 | | | |
| 10.00% Zn | 10.16 | 10.01 | 9.95 | 0.21 | | | |
| | | | combined metal total | 0.96 | 1.825 | | 94.79452 |
| 30.00% A2Z(10.00% La, 10.00% Al, 10.00% Zn) | 10.16 | 7.52 | 7.47 | 2.69 | 180.2083 | | |
| Product | In ppm Initial [PO4] | Intermediate [PO4] 24 hours | Dose Rate = 187.4 ppm Final [PO4] (48 hours) | In ppm [PO4] Removal | | | |
| Control | 10.16 | 10.16 | 10.16 | 0 | | | |
| 10.00% La | 10.16 | 9.64 | 9.51 | 0.65 | | | |
| 10.00% Al | 10.16 | 10.02 | 9.99 | 0.17 | | | |
| 10.00% Zn | 10.16 | 10.00 | 9.97 | 0.19 | | | |
| | | | combined metal total | 1.01 | 1.98 | | 97.9798 |
| 30.00% A2Z(10.00% La, 10.00% Al, 10.00% Zn) | 10.16 | 7.40 | 7.21 | 2.95 | 192.0792 | | |

Table 12 shows the effectiveness of A2Z at 10% concentration of each of the metals.

| Natural Chemistry Mar. 9, 2015 Phosphate Removal 15.00% active | | | | | | | |
|---|---|---|---|---|---|---|---|
| Product | In ppm Initial [PO4] | Intermediate [PO4] 24 hours | Dose rate = 46.9 ppm Final [PO4] (48 hours) | In ppm [PO4] Removal | | | |
| Control | 10.31 | 10.31 | 10.31 | 0 | | | |
| 15.00% La | 10.31 | 9.59 | 9.64 | 0.67 | | | |
| 15.00% Al | 10.31 | 10.22 | 10.17 | 0.14 | | | |
| 15.00% Zn | 10.31 | 10.24 | 10.15 | 0.18 | | | |
| | 10.31 | | combined metal total | 0.97 | 2.35 | | 117.4468 |
| 45.00% A2Z(15.00% La, 15.00% Al, 15.00% Zn) | 10.31 | 7.50 | 6.58 | 3.73 | 284.5361 | | |
| Product | In ppm Initial [PO4] | Intermediate [PO4] 24 hours | Dose rate = 93.7 ppm Final [PO4] (48 hours) | In ppm [PO4] Removal | | | |
| Control | 10.31 | 10.31 | 10.31 | 0 | | | |
| 15.09% La | 10.31 | 9.97 | 0.51 | 0.7 | | | |
| 15.00% Al | 10.31 | 10.23 | 10.16 | 0.15 | | | |
| 15.00% Zn | 10.31 | 10.13 | 10.14 | 0.17 | | | |
| | 10.31 | | combined metal total | 1.02 | 2.72 | | 125 |
| 45.00% A2Z(15.00% La, 15.00% Al, 15.00% Zn) | 10.31 | 7.07 | 5.99 | 4.42 | 333.3333 | | |
| Product | In ppm Initial [PO4] | Intermediate [PO4] 24 hours | Dose rate = 187.4 ppm Final [PO4] (48 hours) | In ppm [PO4] Removal | | | |
| Control | 10.31 | 10.31 | 10.31 | 0 | | | |
| 11.00% La | 10.31 | 9.88 | 9.58 | 0.73 | | | |

-continued

| Natural Chemistry Mar. 9, 2015 Phosphate Removal 15.00% active | | | | | | |
|---|---|---|---|---|---|---|
| 15.00% Al | 10.31 | 10.22 | 10.15 | 0.16 | | |
| 15.90% Zn | 10.31 | 10.10 | 10.09 | 0.22 | | |
| | | | combined metal total | 1.11 | 3.08 | 127.9221 |
| 45.00% A2Z(15.00% La, 15.00% Al, 15.00% Zn) | 10.31 | 5.62 | 5.26 | 5.05 | 354.955 | |

Table 13 shows the effectiveness of A2Z at 15% concentration of each of the metals.

| Natural Chemistry Mar. 11, 2015 Phosphate Removal | | | 20.00% active | | | |
|---|---|---|---|---|---|---|
| Product | In ppm initial [PO4] | Intermediate [PO4] 24 hours | Dose rate = 46.9 ppm Final [PO4] (48 hours) | In ppm [PO4] Removal | | |
| Control | 10.22 | 10.22 | 10.22 | 0 | | |
| 20.00% La | 10.22 | 9.63 | 9.46 | 0.76 | | |
| 20.00% Al | 10.22 | 10.11 | 9.94 | 0.28 | | |
| 20.00% Zn | 10.22 | 9.99 | 9.92 | 0.3 | | |
| | | | combined metal total | 1.34 | 3.615 | 125.8645 |
| 60.00% A2Z (20.00% La, 20.00% Al, 20.00% Zn) | 10.22 | 5.06 | 4.33 | 5.89 | 339.5522 | |
| Product | In ppm initial [PO4] | Intermediate [PO4] 24 hours | Dose rate = 93.7 ppm Final [PO4] (48 hours) | In ppm [PO4] Removal | | |
| Control | 10.22 | 10.22 | 10.22 | 0 | | |
| 20.00% La | 10.22 | 9.44 | 9.38 | 0.84 | | |
| 20.00% Al | 10.22 | 10.05 | 9.91 | 0.31 | | |
| 20.00% Zn | 10.22 | 10.02 | 9.88 | 0.34 | | |
| | | | combined metal total | 1.49 | 4.16 | 128.3654 |
| 60.00% A2Z (20.00% La, 20.00% Al, 20.00% Zn) | 10.22 | 3.61 | 3.39 | 6.83 | 358.3893 | |
| Product | In ppm initial [PO4] | Intermediate [PO4] 24 hours | Dose rate = 187.4 ppm Final [PO4] (48 hours) | In ppm [PO4] Removal | | |
| Control | 10.22 | 10.22 | 10.22 | 0 | | |
| 20.00% La | 10.22 | 9.45 | 9.26 | 0.96 | | |
| 20.00% Al | 10.22 | 9.90 | 9.89 | 0.33 | | |
| 20.00% Zn | 10.22 | 9.86 | 9.85 | 0.37 | | |
| | | | combined metal total | 1.66 | 4.425 | 124.9718 |
| 60.00% A2Z (20.00% La, 20.00% Al, 20.00% Zn) | 10.22 | 3.07 | 3.03 | 7.19 | 333.1325 | |

Table 14 shows the effectiveness of A2Z at 20% concentration of each of the metals.

| Natural Chemistry Mar. 11 2015 Phosphate Removal 25.00% active | | | | | | |
|---|---|---|---|---|---|---|
| Product | In ppm Initial [PO4] | Intermediate [PO4] 24 hours | Dose rate = 46.9 ppm Final [PO4] (48 hours) | In ppm [PO4] Removal | | |
| Control | 10.76 | 10.76 | 10.76 | 0 | | |
| 25.00% La | 10.76 | 9.82 | 9.77 | 0.99 | | |
| 25.00% Al | 10.76 | 10.49 | 10.43 | 0.33 | | |
| 25.00% Zn | 10.76 | 10.53 | 10.42 | 0.34 | | |
| | 10.76 | | combined metal total | 1.66 | 4.315 | 123.0591 |
| 75.00% A2Z(25.00% La, 25.00% Al, 25.00% Zn) | 10.76 | 4.44 | 3.79 | 6.97 | 319.8795 | |
| Product | In ppm Initial [PO4] | Intermediate [PO4] 24 hours | Dose rate = 93.7 ppm Final [PO4] (48 hours) | In ppm [PO4] Removal | | |
| Control | 10.76 | 10.76 | 10.76 | 0 | | |
| 25.00% La | 10.76 | 10.76 | 9.75 | 1.01 | | |

| Natural Chemistry Mar. 11 2015 Phosphate Removal 25.00% active | | | | | | |
|---|---|---|---|---|---|---|
| 25.00% Al | 10.76 | 10.76 | 10.39 | 0.37 | | |
| 25.00% Zn | 10.76 | 10.67 | 10.38 | 0.38 | | |
| | 10.76 | | combined metal total | 1.76 | 4.655 | 124.3824 |
| 75.00% A2Z(25.00% La, 25.00% Al, 25.00% Zn) | 10.76 | 4.15 | 3.21 | 7.55 | 328.9773 | |

| Product | In ppm Initial [PO4] | Intermediate [PO4] 24 hours | Dose rate = 187.4 ppm Final [PO4] (48 hours) | In ppm [PO4] Removal | | |
|---|---|---|---|---|---|---|
| Control | 10.76 | 10.76 | 10.76 | 0 | | |
| 25.00% La | 10.76 | 9.73 | 9.62 | 0.14 | | |
| 25.00% Al | 10.76 | 10.39 | 10.38 | 0.38 | | |
| 25.00% Zn | 10.76 | 10.50 | 10.45 | 0.31 | | |
| | 10.76 | | combined metal total | 1.83 | 5.275 | 130.6161 |
| 75.00% A2Z(25.00% La, 25.00% Al, 25.00% Zn) | 10.76 | 2.58 | 2.04 | 8.72 | 376.5027 | |

Table 15 shows the effectiveness of A2Z at 25% concentration of each of the metals.

| Natural Chemistry Mar. 17, 2015 Phosphate Removal 30.00% active | | | | | | |
|---|---|---|---|---|---|---|
| Product | In ppm Initial [PO4] | Intermediate [PO4] 24 hours | Dose rate = 46.9 ppm Final [PO4] (48 hours) | In ppm [PO4] Removal | | |
| Control | 10.52 | 10.52 | 10.52 | 0 | | |
| 30.00% La | 10.52 | 9.41 | 9.33 | 1.19 | | |
| 30.00% Al | 10.52 | 10.18 | 10.12 | 0.4 | | |
| 30.00% Zn | 10.52 | 10.23 | 10.14 | 0.38 | | |
| | | | combined metal total | 1.97 | 5.81 | 132.1859 |
| 90.00% A2Z(30.00% La, 30.00% Al, 30.00% Zn) | 10.52 | 1.40 | 0.87 | 9.65 | 389.8477 | |
| Product | In ppm Initial [PO4] | Intermediate [PO4] 24 hours | Dose Rate = 93.7 ppm Final [PO4] (48 hours) | In ppm [PO4] Removal | | |
| Control | 10.52 | 10.52 | 10.52 | 0 | | |
| 30.00% La | 10.52 | 9.36 | 9.29 | 1.23 | | |
| 30.00% Al | 10.52 | 10.13 | 10.09 | 0.43 | | |
| 30.00% Zn | 10.52 | 10.12 | 10.1 | 0.42 | | |
| | | | combined metal total | 2.08 | 6.245 | 133.3867 |
| 90.00% A2Z(30.00% La, 30.00% Al, 30.00% Zn) | 10.52 | 1.75 | 0.11 | 10.41 | 400.4808 | |
| Product | In ppm Initial [PO4] | Intermediate [PO4] 24 hours | Dose Rate = 187.4 ppm Final [PO4] (48 hours) | In ppm [PO4] Removal | | |
| Control | 10.52 | 10.52 | 10.52 | 0 | | |
| 30.00% La | 10.52 | 10.52 | 9.24 | 1.28 | | |
| 30.00% Al | 10.52 | 10.52 | 10.08 | 0.44 | | |
| 30.00% Zn | 10.52 | 10.52 | 10.09 | 0.43 | | |
| | | | combined metal totol | 2.15 | 6.335 | 132.1231 |
| 90.00% A2Z(30.00% La, 30.00% Al, 30.00% Zn) | 10.52 | 10.52 | 0 | 10.52 | 389.3023 | |

Table 16 shows the effectiveness of A2Z at 30% concentration of each of the metals.

| Natural Chemistry Mar. 17, 2015 Phosphate Removal 33.33% active | | | | |
|---|---|---|---|---|
| Product | In ppm Initial [PO4] | Intermediate [PO4] 24 hours | Dose rate = 46.9 ppm Final [PO4] (48 hours) | In ppm [PO4] Removal |
| Control | 10.23 | 10.23 | 10.23 | 0 |
| 33.33% La | 10.23 | 9.15 | 9.02 | 1.21 |

| Natural Chemistry Mar. 17, 2015 Phosphate Removal 33.33% active | | | | | | |
|---|---|---|---|---|---|---|
| 33.33% Al | 10.23 | 9.80 | 9.79 | 0.44 | | |
| 33.33% Zn | 10.23 | 9.88 | 9.84 | 0.39 | | |
| | | | combined metal total | 2.04 | 6.135 | 133.4963 |
| 99.99% A2Z(33.33% La, 33.33% Al, 33.33% Zn) | 10.23 | 0.36 | 0 | 10.23 | 401.4706 | |

| Product | In ppm Initial [PO4] | Intermediate [PO4] 24 hours | Dose Rate = 93.7 ppm Final [PO4] (48 hours) | In ppm [PO4] Removal | | |
|---|---|---|---|---|---|---|
| Control | 10.23 | 10.23 | 10.23 | 0 | | |
| 33.33% La | 10.23 | 8.99 | 8.93 | 1.3 | | |
| 33.33% Al | 10.23 | 9.82 | 9.76 | 0.47 | | |
| 33.33% Zn | 10.23 | 9.81 | 9.8 | 0.43 | | |
| | | | combined metal total | 2.2 | 6.215 | 129.2035 |
| 99.99% A2Z(33.33% La, 33.33% Al, 33.33% Zn) | 10.23 | 0.15 | 0 | 10.23 | 365 | |

| Product | In ppm Initial [PO4] | Intermediate [PO4] 24 hours | Dose Rate = 187.4 ppm Final [PO4] (48 hours) | In ppm [PO4] Removal | | |
|---|---|---|---|---|---|---|
| Control | 10.23 | 10.23 | 10.23 | 0 | | |
| 33.33% La | 10.23 | 8.94 | 8.88 | 1.35 | | |
| 33.33% Al | 10.23 | 9.86 | 9.74 | 0.49 | | |
| 33.33% Zn | 10.23 | 9.99 | 9.79 | 0.44 | | |
| | | | combined metal total | 2.28 | 6.255 | 127.0983 |
| 99.99% A2Z(33.33% La, 33.33% Al, 33.33% Zn) | 10.23 | 0.00 | 0 | 10.23 | 348.6842 | |

Table 17 shows the effectiveness of A2Z at 33% concentration of each of the metals.

When comparing the sum of the individual metals and the combination formula in every test, the combination had a higher removal rate of [PO4]. This phenomenon may be attributed to a synergistic effect of the active metals in a specific concentration to remove the optimal amount of phosphate present. This phenomenon was also present when the tests were scaled-up as can be seen in the following tables.

| Natural Chemistry Mar. 16, 2015 Phosphate Removal 15.00% active Compare to Lab results at the bottom of page | | | | | | | | |
|---|---|---|---|---|---|---|---|---|
| Product | In ppm Initial [PO4] | Intermediate [PO4] 24 hours | Dose rate = 46.9 ppm Final [PO4] (48 hours) | In ppm [PO4] Removal | | | filter type | Gallons used |
| Control | 1.16 | 1.16 | 1.16 | 0 | | | Cartridge | 275 |
| 15.00% La | 1.18 | 0.69 | 0.51 | 0.67 | | | Cartridge | 275 |
| 15.00% Al | 1.18 | 1.10 | 1.05 | 0.13 | | | Cartridge | 275 |
| 15.00% Zn | 1.18 | 1.03 | 1.03 | 0.15 | | | Cartridge | 275 |
| | | | combined metal total | 0.95 | 1.07 | 22.42991 | | |
| 45.00% A2Z(15.00% La, 15.00% Al, 15.00% Zn) | 1.19 | 0.06 | 0 | 1.19 | 25.26316 | | Cartridge | 275 |
| Control | 1.20 | 1.20 | 1.2 | 0 | | | Cartridge | 275 |
| Control | 1.23 | 1.23 | 1.23 | 0 | | | Sand | 500 |
| 15.00% La | 1.21 | 0.64 | 0.59 | 0.62 | | | Sand | 500 |
| 15.00% Al | 1.21 | 1.13 | 1.1 | 0.11 | | | Sand | 500 |
| 15.00% Zn | 1.21 | 1.06 | 1.1 | 0.11 | | | Sand | 500 |
| | | | combined metal total | 0.84 | 1.06 | 41.50943 | | |
| 45.00% A2Z(15.00% La, 15.00% Al, 15.00% Zn) | 1.28 | 0.60 | 0 | 1.28 | 52.38095 | | Sand | 500 |
| Control | 1.25 | 1.25 | 1.25 | 0 | | | Sand | 500 |
| Control | 1.03 | 1.03 | 1.03 | 0 | | | DE | 500 |
| 15.00% La | 1.09 | 0.44 | 0.42 | 0.67 | | | DE | 500 |
| 15.00% Al | 1.09 | 0.97 | 0.96 | 0.13 | | | DE | 500 |
| 15.00% Zn | 1.09 | 0.92 | 0.88 | 0.21 | | | DE | 500 |
| | | | combined metal total | 1.01 | 1.03 | 3.883495 | | |
| 45.00% A2Z(15.00% La, 15.00% Al, 15.00% Zn) | 1.05 | 0.00 | 0 | 1.05 | 3.960396 | | DE | 500 |
| Control | 1.06 | 1.06 | 1.06 | 0 | | | DE | 500 |
| Control | 1.05 | 1.05 | 1.04 | 0.01 | | | | |
| 15.00% La | 1.05 | 0.76 | 0.4 | 0.65 | | | | |

-continued

| | | | Natural Chemistry Mar. 16, 2015 Phosphate Removal 15.00% active Compare to Lab results at the bottom of page | | | | | |
|---|---|---|---|---|---|---|---|---|
| Product | In ppm Initial [PO4] | Intermediate [PO4] 24 hours | Dose rate = 46.9 ppm Final [PO4] (48 hours) | In ppm [PO4] Removal | | | filter type | Gallons used |
| 15.00% Al | 1.05 | 1.03 | 0.94 | 0.11 | | | | |
| 15.00% Zn | 1.05 | 1 | 0.88 | 0.17 | | | | |
| | | | combined metal total | 0.93 | 0.985 | 11.16751 | | |
| 45.00% A2Z(15.00% La, 15.00% Al, 15.00% Zn) | 1.05 | 0.01 | 0.01 | 1.04 | 11.82796 | | | |

Table 18 the effectiveness of A2Z: at 15% concentration of each of the metals.

| | | | Natural Chemistry 42082 Phosphate Removal 15.00% active Compare to Lab results at the bottom of page | | | | | |
|---|---|---|---|---|---|---|---|---|
| Product | In ppm Initial [PO4] | Intermediate [PO4] 24 hours | Dose rate = 46.9 ppm Final [PO4] (48 hours) | In ppm [PO4] Removal | | | filter type | Gallons used |
| Control | 5.1 | 5.1 | 5.1 | 0 | | | Cartridge | 275 |
| 15.00% La | 5.01 | 4.41 | 4.41 | 0.6 | | | Cartridge | 275 |
| 15.00% Al | 5.01 | 4.89 | 4.86 | 0.15 | | | Cartridge | 275 |
| 15.00% Zn | 5.01 | 4.88 | 4.83 | 0.18 | | | Cartridge | 275 |
| | | | combined metal total | 0.93 | 1.805 | 96.95291 | | |
| 45.00% A2Z(15.00% La, 15.00% Al, 15.00% Zn) | 5 | 1.37 | 2.32 | 2.68 | 188.172 | | Cartridge | 275 |
| Control | 5.07 | 5.07 | 5.07 | 0 | | | Cartridge | 275 |
| Control | 5.09 | 5.09 | 5.09 | 0 | | | Sand | 500 |
| 15.00% La | 5.03 | 4.51 | 4.42 | 0.61 | | | Sand | 500 |
| 15.00% Al | 5.03 | 4.99 | 4.93 | 0.1 | | | Sand | 500 |
| 15.00% Zn | 5.03 | 4.92 | 4.88 | 0.15 | | | Sand | 500 |
| | | | combined metal total | 0.86 | 1.635 | 94.80122 | | |
| 45.00% A2Z(15.00% La, 15.00% Al, 15.00% Zn) | 5.06 | 2.96 | 2.65 | 2.41 | 180.2326 | | Sand | 500 |
| Control | 5.08 | 5.08 | 5.08 | 0 | | | Sand | 500 |
| Control | 5.02 | 5.02 | 5.02 | 0 | | | DE | 500 |
| 15.00% La | 5.05 | 4.46 | 4.41 | 0.64 | | | DE | 500 |
| 15.00% Al | 5.05 | 4.93 | 4.92 | 0.13 | | | DE | 500 |
| 15.00% Zn | 5.05 | 4.98 | 4.87 | 0.18 | | | DE | 500 |
| | | | combined metal total | 0.95 | 2.385 | 120.9354 | | |
| 45.00% A2Z(15.00% La, 15.00% Al, 15.00% Zn) | 5.04 | 2.01 | 1.72 | 3.82 | 302.1053 | | DE | 500 |
| Control | 5.09 | 5.09 | 5.09 | 0 | | | DE | 500 |
| Control | 5.18 | 5.18 | 5.18 | 0 | | | | |
| 15.00% La | 5.18 | 4.6 | 4.55 | 0.63 | | | | |
| 15.00% Al | 5.18 | 5.09 | 5.06 | 0.12 | | | | |
| 15.00% Zn | 5.18 | 5.05 | 5.01 | 0.17 | | | | |
| | | | combined metal total | 0.92 | 1.685 | 90.80119 | | |
| 45.00% A2Z(15.00% La, 15.00% Al, 15.00% Zn) | 5.18 | 2.88 | 2.73 | 2.45 | 166.3043 | | | |

Table 19 shows the effectiveness of A2Z at 15% concentration of each of the metals.

| | | | Natural Chemistry 42084 Phosphate Removal 10.00% active Compare to Lab results at the bottom of page | | | | |
|---|---|---|---|---|---|---|---|
| Product | In ppm Initial [PO4] | Intermediate [PO4] 24 hours | Dose rate = 46.9 ppm Final [PO4] (48 hours) | In ppm [PO4] Removal | | filter type | Gallons used |
| Control | 2.02 | 2.02 | 2.02 | 0 | | Cartridge | 275 |
| 10.00% La | 2.07 | 1.23 | 1.14 | 0.93 | | Cartridge | 275 |

Natural Chemistry 42084 Phosphate Removal 10.00% active
Compare to Lab results at the bottom of page

| Product | In ppm Initial [PO4] | Intermediate [PO4] 24 hours | Dose rate = 46.9 ppm Final [PO4] (48 hours) | In ppm [PO4] Removal | | | filter type | Gallons used |
|---|---|---|---|---|---|---|---|---|
| 10.00% Al | 2.07 | 1.88 | 1.81 | 0.26 | | | Cartridge | 275 |
| 10.00% Zn | 2.07 | 1.85 | 1.87 | 0.25 | | | Cartridge | 275 |
| | | | combined metal total | 1.44 | 1.75 | 35.42857 | | |
| 30.00% A2Z(10.00% La, 10.00% Al, 10.00% Zn) | 2.06 | 0.33 | 0 | 2.06 | 43.05556 | | Cartridge | 275 |
| Control | 2.09 | 2.09 | 2.09 | 0 | | | Cartridge | 275 |
| Control | 2.38 | 2.38 | 2.38 | 0 | | | Sand | 500 |
| 10.00% La | 2.31 | 1.64 | 1.49 | 0.82 | | | Sand | 500 |
| 10.00% Al | 2.31 | 2.11 | 2.07 | 0.24 | | | Sand | 500 |
| 10.00% Zn | 2.31 | 2.09 | 2.05 | 0.26 | | | Sand | 500 |
| | | | combined metal total | 1.32 | 1.825 | 55.34247 | | |
| 30.00% A2Z(10.00% La, 10.00% Al, 10.00% Zn) | 2.33 | 0.64 | 0 | 2.33 | 76.51515 | | Sand | 500 |
| Control | 2.35 | 2.35 | 2.35 | 0 | | | Sand | 500 |
| Control | 2.21 | 2.21 | 2.21 | 0 | | | DE | 500 |
| 10.00% La | 2.16 | 1.19 | 1.17 | 0.99 | | | DE | 500 |
| 10.00% Al | 2.16 | 1.89 | 1.88 | 0.28 | | | DE | 500 |
| 10.00% Zn | 2.16 | 1.9 | 1.89 | 0.27 | | | DE | 500 |
| | | | combined metal total | 1.54 | 1.825 | 31.23288 | | |
| 30.00% A2Z(10.00% La, 10.00% Al, 10.00% Zn) | 2.11 | 0.15 | 0 | 2.11 | 37.01299 | | DE | 500 |
| Control | 2.13 | 2.13 | 2.13 | 0 | | | DE | 500 |

Table 20 shows the effectiveness of A2Z at 10% concentration of each of the metals.

Natural Chemistry 42086 Phosphate Removal 10.00% active
Compare to Lab results at the bottom of page

| Product | In ppm Initial [PO4] | Intermediate [PO4] 24 hours | Dose rate = 46.9 ppm Final [PO4] (48 hours) | In ppm [PO4] Removal | | | filter type | Gallons used |
|---|---|---|---|---|---|---|---|---|
| Control | 10.22 | 10.22 | 10.22 | 0 | | | Cartridge | 275 |
| 10.00% La | 10.23 | 9.67 | 9.58 | 0.65 | | | Cartridge | 275 |
| 10.00% Al | 10.23 | 10.09 | 10.08 | 0.15 | | | Cartridge | 275 |
| 10.00% Zn | 10.23 | 10.06 | 10.05 | 0.16 | | | Cartridge | 275 |
| | | | combined metal total | 0.98 | 1.61 | 78.26087 | | |
| 30.00% A2Z(10.00% La, 10.00% Al, 10.00% Zn) | 10.25 | 8.72 | 8.01 | 2.24 | 128.5714 | | Cartridge | 275 |
| Control | 10.2 | 10.2 | 10.2 | 0 | | | Cartridge | 275 |
| Control | 10.01 | 10.01 | 10.01 | 0 | | | Sand | 500 |
| 10.00% La | 10.04 | 9.53 | 9.41 | 0.63 | | | Sand | 500 |
| 10.00% Al | 10.04 | 10.01 | 9.98 | 0.06 | | | Sand | 500 |
| 10.00% Zn | 10.04 | 9.59 | 9.99 | 0.05 | | | Sand | 500 |
| | | | combined metal total | 0.74 | 1.435 | 96.86411 | | |
| 30.00% A2Z(10.00% La, 10.00% Al, 10.00% Zn) | 10.08 | 8.15 | 7.96 | 2.13 | 187.8378 | | Sand | 500 |
| Control | 10.06 | 10.06 | 10.06 | 0 | | | Sand | 500 |
| Control | 10.5 | 10.5 | 10.5 | 0 | | | DE | 500 |
| 10.00% La | 10.49 | 9.88 | 9.82 | 0.67 | | | DE | 500 |
| 10.00% Al | 10.49 | 10.45 | 10.31 | 0.18 | | | DE | 500 |
| 10.00% Zn | 10.49 | 10.42 | 10.3 | 0.19 | | | DE | 500 |
| | | | combined metal total | 1.04 | 1.73 | 79.76879 | | |
| 30.00% A2Z(10.00% La, 10.00% Al, 10.00% Zn) | 10.44 | 8.09 | 8.02 | 2.42 | 132.6923 | | DE | 500 |
| Control | 10.47 | 10.47 | 10.47 | 0 | | | DE | 500 |
| Control | 10.16 | 10.16 | 10.16 | 0 | | | | |
| 10.00% La | 10.16 | 9.55 | 9.55 | 0.61 | | | | |

Natural Chemistry 42086 Phosphate Removal 10.00% active
Compare to Lab results at the bottom of page

| Product | In ppm Initial [PO4] | Intermediate [PO4] 24 hours | Dose rate = 46.9 ppm Final [PO4] (48 hours) | In ppm [PO4] Removal | | | filter type | Gallons used |
|---|---|---|---|---|---|---|---|---|
| 10.00% Al | 10.16 | 10.05 | 10.02 | 0.14 | | | | |
| 10.00% Zn | 10.16 | 10 | 9.97 | 0.19 | | | | |
| | | 10 | combined metal total | 0.94 | 1.555 | 79.09958 | | |
| 30.00% A2Z(10.00% La, 10.00% Al, 10.00% Zn) | 10.16 | 8.32 | 7.99 | 2.17 | 130.8511 | | | |

Table 21 shows the effectiveness of A2Z at 10% concentration of each of the metals.

Natural Chemistry 42087 Phosphate Removal 45.00% active

| Product | In ppm Initial [PO4] | Intermediate [PO4] 24 hours | Dose rate = 46.9 ppm Final [PO4] (48 hours) | In ppm [PO4] Removal | | | filter type | Gallons used |
|---|---|---|---|---|---|---|---|---|
| Control | 10.26 | 10.26 | 10.26 | 0 | | | Cartridge | 275 |
| 45.00% La | 10.31 | 9.03 | 8.94 | 1.37 | | | Cartridge | 275 |
| | | | combined metal total | 1.37 | 2.635 | 96.0152 | | |
| 45.00% A2Z(15.00% La, 15.00% Al, 15.00% | 10.28 | 7.54 | 6.38 | 3.9 | 184.67 | | Cartridge | 275 |
| Control | 10.29 | 10.29 | 10.29 | 0 | | | Cartridge | 275 |
| Control | 10.39 | 10.39 | 10.39 | 0 | | | Sand | 500 |
| 45.00% La | 10.35 | 9.22 | 9.05 | 1.3 | | | Sand | 500 |
| | | | combined metal total | 1.3 | 2.575 | 99.0291 | | |
| 45.00% A2Z(15.00% La, 15.00% Al, 15.00% | 10.34 | 7.77 | 6.49 | 3.85 | 196.15 | | Sand | 500 |
| Control | 10.37 | 10.37 | 10.37 | 0 | | | Sand | 500 |
| Control | 10.18 | 10.18 | 10.18 | 0 | | | DE | 500 |
| 45.00% La | 10.11 | 8.78 | 8.69 | 1.42 | | | DE | 500 |
| | | | combined metal total | 1.42 | 2.7 | 94.8148 | | |
| 45.00% A2Z(15.00% La, 15.00% Al, 15.00% | 10.13 | 7.24 | 6.15 | 3.98 | 180.28 | | DE | 500 |
| Control | 10.14 | 10.14 | 10.14 | 0 | | | DE | 500 |
| Control | 10.04 | 10.04 | 10.04 | 0 | | | Lab | 1 L |
| 45.00% La | 10.04 | 9.03 | 8.78 | 1.26 | | | Lab | 1 L |
| | | | combined metal total | 1.26 | 2.495 | 98.998 | | |
| 45.00% A2Z(15.00% La, 15.00% Al, 15.00% | 10.04 | 6.56 | 6.31 | 3.73 | 196.05 | | Lab | 1 L |

Table 24 shows the effectiveness of A2Z at 15% concentration of each of the metals.

While the invention has been described and disclosed in various terms and certain embodiments, the scope of the invention is not intended to be, nor should it be deemed to be, limited thereby and such other modifications or embodiments as may be suggested by the teachings herein are particularly reserved especially as they fall within the breadth and scope of the claims here appended.

What is claimed is:

1. A method for purifying a solution comprising the steps of;
   (a) introducing a reagent comprising a 7.20% of a zinc compound, 7.61% of a lanthanum compound, and 1.86% of an aluminum compound to an impure solution comprising a phosphate;
   (b) allowing the reagent to react with those impurities in the solution to form an insoluble reaction product; and
   (c) removing the reaction product from the solution.

2. The method of claim 1, wherein the solution is contained in a pool.

3. The method of claim 1, wherein the solution is contained in a hot tub.

4. The method of claim 1, wherein the reagent further comprises at least one enzyme composition.

5. The method of claim 4, wherein the enzyme composition has at least one of lipase, .alpha.-amylase or protease activities.

6. A method for treating a water body comprising the steps of:
   (a) introducing a phosphate-scavenging composition comprising 7.20% of a zinc compound, 7.61% of a lanthanum compound, and 1.86% of an aluminum compound to the water body;
   (b) introducing a second composition comprising an enzymatic compound to the water body;
   (c) allowing the first composition to react with impurities in water body to form an insoluble reaction product;
   (d) removing the reaction product from the solution; and
   (e) allowing the second composition to clarify the water body.

7. A method for removing phosphate from swimming pools or spas comprising the steps of:

(a) treating water with 7.20% zinc compound, 7.61% lanthanum compound, and 1.86% aluminum compound;
(b) allowing the zinc compound to react with a phosphate in the water;
(c) repeating this process periodically to maintain low levels of phosphate in the water.

8. The method of claim 7 wherein the zinc compound is in a form selected from the group consisting of a slurry, a tablet, a powder, or granulated.

9. The method of claim 7 wherein the zinc compound is zinc sulfate.

10. The method of claim 7 wherein the zinc compound is zinc chloride.

11. The method of claim 7 wherein the method is repeated as necessary to maintain a maximum phosphate content of about 50 parts per billion in the water.

12. A composition for use in the removal of dissolved phosphate from swimming pool water comprising:
7.20% zinc compound, 7.61% lanthanum compound, and 1.86% aluminum compound and at least one enzyme.

13. The composition of claim 12, wherein the zinc compound is zinc sulfate.

14. The composition of claim 12, wherein the zinc compound is zinc chloride.

15. The composition of claim 12, wherein the enzyme composition has at least one of lipase, alpha-amylase or protease activities.

* * * * *